US010041597B2

(12) United States Patent
Csoma et al.

(10) Patent No.: US 10,041,597 B2
(45) Date of Patent: Aug. 7, 2018

(54) SEAL RING FOR AXIALLY SEALING TWO PARTS ARRANGED SO AS TO BE ABLE TO MOVE AXIALLY WITH RESPECT TO ONE ANOTHER, AND SEAL SYSTEM HAVING THE SEAL RING

(71) Applicant: KNORR-BREMSE Systeme fuer Nutzfahrzeuge GmbH, Munich (DE)

(72) Inventors: Zsigmond Csoma, Perbal (HU); David Jakab, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/438,865

(22) Filed: Feb. 22, 2017

(65) Prior Publication Data
US 2017/0159827 A1 Jun. 8, 2017

Related U.S. Application Data

(63) Continuation of application No. PCT/EP2015/069199, filed on Aug. 21, 2015.

(30) Foreign Application Priority Data

Aug. 22, 2014 (DE) ........................ 10 2014 112 013

(51) Int. Cl.
F16J 15/32 (2016.01)
F16J 15/48 (2006.01)
F16J 15/3236 (2016.01)

(52) U.S. Cl.
CPC ........... *F16J 15/48* (2013.01); *F16J 15/3236* (2013.01)

(58) Field of Classification Search
CPC .... F16J 15/46; F16J 15/48; F16J 15/32; F16J 15/3204; F16J 15/3232; F16J 15/3236
See application file for complete search history.

(56) References Cited

U.S. PATENT DOCUMENTS 373,256 A 11/1887 Traver et al.
2,204,507 A 6/1940 Martin
(Continued)

FOREIGN PATENT DOCUMENTS

CA 1 170 288 A 7/1984
CN 202371170 U 8/2012
(Continued)

OTHER PUBLICATIONS

German-language Office Action issued in counterpart German Application No. 10 2014 112 013.2 dated Dec. 22, 2014 (7 pages).
(Continued)

*Primary Examiner* — Gilbert Y Lee
(74) *Attorney, Agent, or Firm* — Crowell & Moring LLP

(57) ABSTRACT

A seal ring is provided for axially sealing two parts arranged so as to be able to move axially with respect to one another. The seal ring has two sealing lips which are arranged circumferentially on an axial first end side of the seal ring. In this context, the sealing lips are designed such that they can be spread apart from one another by a first fluid pressure of a first fluid volume to bear in a sealing manner against mutually opposing sealing faces of a first of the parts. The seal ring also has a sealing projection which is arranged circumferentially on a second end side of the seal ring, oriented axially away from the first end side. In that context, the sealing projection is designed in order, when in a state bearing against a sealing surface of a second of the parts, to seal the first fluid volume in a region arranged radially inward with respect to the sealing projection against a second fluid volume at a second fluid pressure in a region arranged radially outward with respect to the sealing projection.

11 Claims, 2 Drawing Sheets

(56) References Cited

U.S. PATENT DOCUMENTS

| | | | | |
|---|---|---|---|---|
| 5,507,505 A * | 4/1996 | von-Arndt | ............ | F16J 15/3236 277/436 |
| 8,579,298 B2 * | 11/2013 | Jinbo | .................... | F16J 15/3236 277/559 |
| 2004/0150168 A1 | 8/2004 | Heathcott et al. | | |
| 2006/0157941 A1 | 7/2006 | Vitel et al. | | |
| 2011/0012313 A1 * | 1/2011 | Lev | ....................... | F16J 15/3236 277/562 |
| 2017/0030468 A1 * | 2/2017 | Badrossamay | ....... | F16J 15/3236 |

FOREIGN PATENT DOCUMENTS

| | | |
|---|---|---|
| CN | 103026108 A | 4/2013 |
| DE | 20 49 329 | 4/1972 |
| DE | 103 27 777 A1 | 1/2005 |
| FR | 985.320 | 7/1951 |
| FR | 2 820 191 A1 | 8/2002 |

OTHER PUBLICATIONS

International Search Report (PCT/ISA/210) issued in PCT Application No. PCT/EP2015/069199 dated Nov. 10, 2015 with English translation (7 pages).

German-language Written Opinion (PCT/ISA/237) issued in PCT Application No. PCT/EP2015/069199 dated Nov. 10, 2015 (6 pages).

International Preliminary Report on Patentability (PCT/IB/ 326, PCT/IB/338, & PCT/IB/373) issued in PCT Application No. PCT/EP2015/069199 dated Mar. 9, 2017, including English translation of document C3 (German-language Written Opinion (PCT/ISA/237)) previously filed on Feb. 22, 2017 (9 pages).

Chinese-language Office Action issued in counterpart Chinese Application No. 201580045143.7 dated Dec. 4, 2017 with English translation (Sixteen (16) pages).

\* cited by examiner

SEAL RING FOR AXIALLY SEALING TWO PARTS ARRANGED SO AS TO BE ABLE TO MOVE AXIALLY WITH RESPECT TO ONE ANOTHER, AND SEAL SYSTEM HAVING THE SEAL RING

CROSS REFERENCE TO RELATED APPLICATIONS

This application is a continuation of PCT International Application No. PCT/EP2015/069199, filed Aug. 21, 2015, which claims priority under 35 U.S.C. § 119 from German Patent Application No. 10 2014 112 013.2, filed Aug. 22, 2014, the entire disclosures of which are herein expressly incorporated by reference.

BACKGROUND AND SUMMARY OF THE INVENTION

The present invention pertains to a seal ring for axially sealing two parts arranged so as to be able to move axially with respect to one another, and a seal system with two parts arranged so as to be able to move axially with respect to one another and being axial sealed. The invention further relates to a method for making a seal ring for axially sealing two parts arranged so as to be able to move axially with respect to one another, and a method for operating a seal system with two parts arranged so as to be able to move axially with respect to one another and axial sealing.

Seal rings are known, such as K rings or rings having a K-shaped profile, for applications in radial sealing of parts able to move relative to each other. DE 103 27 777 A1 discloses a sealing arrangement for the sealing of two parts able to move axially with respect to one another for a radial sealing application.

The problem which the present invention proposes to solve is to create an improved seal ring for axially sealing two parts arranged so as to be able to move axially with respect to one another, and an improved seal system with two parts arranged so as to be able to move axially with respect to one another and being axial sealed. The present invention further creates an improved method for making a seal ring for axially sealing two parts arranged so as to be able to move axially with respect to one another, and an improved method for operating a seal system with two parts arranged so as to be able to move axially with respect to one another and axial sealing.

This problem is solved by a seal ring for axially sealing two parts arranged so as to be able to move axially with respect to one another, and a seal system with two parts arranged so as to be able to move axially with respect to one another and being axially sealed in accordance with embodiments of the invention. The problem is also solved by a method for making a seal ring for axially sealing two parts arranged so as to be able to move axially with respect to one another, and a method for operating a seal system with two parts arranged so as to be able to move axially with respect to one another and axial sealing according to embodiments of the invention.

According to embodiments of the present invention, an axial sealing can be accomplished, wherein in particular two fluid volumes can be sealed against one another, of which one of them can be subjected to an excess pressure. Thus, for example, one side of a seal ring can be subjected to pressure in order to accomplish an axial sealing between surfaces of two parts, which can have a relative axial movement with respect to one another. The seal ring in particular can be designed as an axial K ring.

Advantageously, according to embodiments of the present invention, a reliable axial sealing can be accomplished even if the two seal surfaces have a high tolerance with respect to one another. An axial K ring as the seal ring or seal element can offer technical and economic benefits, especially during applications in which a tolerance of a spacing between two parts being sealed is too great for the use of an O ring. The technical benefits can consist, for example, in that an axial seal according to embodiments of the present invention in a state not subjected to pressure exerts no axial load on the opposing surfaces or the two parts being sealed and, in a state subjected to pressure, it only exerts a relatively slight axial load on them. Moreover, in the opposite direction a venting of air through the seal can also be made possible. The economic benefits may consist, for example, in that existing parts can be used without modification, especially in the case of an application with a check valve and a solenoid, especially without modification of the solenoid part. For example, it is also possible to refrain from plunging the magnetic core into the check valve in order to seal off the parts with a radial sealing, or to narrow a length tolerance for the parts being sealed off. The axial sealing according to embodiments of the present invention can also be employed generally in applications where an axial seal is required when there is a relatively high tolerance on the spacing of the two parts from each other and also an excess pressure on only one side.

The seal ring for the axial sealing of two parts arranged so as to be able to move axially with respect to one another has the following features:

a) two sealing lips, which are arranged circumferentially on an axial first end side of the seal ring, wherein the sealing lips are designed such that they can be spread apart from one another by a first fluid pressure of a first fluid volume so as to bear in a sealing manner against mutually opposing sealing faces of a first of the parts; and b) a sealing projection, which is arranged circumferentially on a second end side of the seal ring, oriented axially away from the first end side, wherein the sealing projection is designed in order, when in a state bearing against a sealing surface of a second of the parts, to seal the first fluid volume in a region arranged radially inward with respect to the sealing projection against a second fluid volume at a second fluid pressure in a region arranged radially outward with respect to the sealing projection.

The first part can be a valve, for example, especially a check valve, and it can have a double check valve, for example. The second part can be, for example, a solenoid, a magnetic core, a magnetic core arrangement or the like. In particular, the seal ring in combination with a sealing system can be used in an application for electronic fluid level control of a vehicle trailer, for example. In this case, the seal element can be used to provide an axial sealing, especially between a double check valve and a magnetic core tube. The seal ring in this case can be designed in particular as an axial K ring or a K ring for axial sealing or a seal ring with K-shaped cross section profile for axial sealing. The seal ring can be designed so as to seal off the first fluid volume, which can be arranged in the region of the first end side as well as in a region of the second end side arranged radially inward from the sealing projection, and the second fluid volume in a region of the second end side arranged radially outward from the sealing projection, from each other. The two opposing or parallel sealing faces of the first part can be oriented slanted or normal with respect to the sealing face of the second part. The sealing projection can be formed by two partial portions of the second end side of the seal ring which are sloping with respect to the sealing projection.

According to one embodiment, the seal ring can be designed such that, when a fluid pressure gradient is present between the first fluid pressure of the first fluid volume and the second fluid pressure of the second fluid volume, the first fluid pressure being greater than the second fluid pressure, it can move axially in the direction from the first end side toward the second end side with the sealing projection into a sealing position bearing against the sealing face of the second part. When the fluid pressure gradient is present, the sealing lips can be designed to be pressed into a sealing bearing position against the opposing faces of the first part. Such a design affords the advantage that the pressure difference can be used to accomplish a reliable sealing which is reversible upon removal or reversal of the pressure gradient.

The sealing lips can also be designed to subtend between them an acute resting opening angle in a non-installed state of the seal ring. The resting opening angle here can be greater than 30 degrees, for example, especially 40 degrees or more, and merely as an example it can be less than 70 degrees. The resting opening angle can alternatively also be an obtuse angle. Moreover, the sealing lips can be designed to subtend a spreading angle in an installed state of the seal ring which is smaller than the resting opening angle, at least when the fluid pressure gradient is absent. Such a design affords the advantage that a sealing action of the sealing lips can be increased, since their spreading into a position bearing against the sealing faces is facilitated.

Moreover, the sealing lips can be formed from a first elastic material with a first surface roughness in a first surface portion, having end portions of the sealing lips comprising the sealing projection and sealing edges, and a second surface roughness in a second surface portion outside of the first surface portion, the first surface roughness being less than the second surface roughness. The elastic material here can be a plastic material. The surface roughness here can be indicated or characterized by an average roughness value. Thus, the end portions of the sealing lips comprising the sealing projection and sealing edges can have a smaller surface roughness than the remaining surface of the seal ring. Such an embodiment affords the advantage that the sealing action of the seal ring against the sealing lips can be heightened and made more reliable.

A seal system with two parts arranged so as to be able to move axially with respect to one another and axial sealing has the following features:

a) a first part, in which an annular groove is formed with mutually opposing sealing faces;

b) a second part with a sealing face, wherein the first part and the second part are arranged able to move with respect to one another along a mutual axial axis; and c) a design of the aforementioned seal ring, wherein at least the sealing lips of the seal ring in the groove of the first part and the sealing projection of the seal ring are or can be arranged bordering on the sealing face of the second part.

In connection with the seal system, an embodiment of the aforementioned seal ring can be used advantageously to produce an axial sealing between the parts or the fluid volumes.

According to one embodiment, at least one through opening can be provided, which is formed in the first part between the groove and a chamber which can be subjected to the first fluid pressure of the first fluid volume. The at least one through opening can represent a flow connection between the chamber and the groove. The at least one through opening can emerge into a surface portion of the groove which is separated or spaced apart from the opposing sealing faces of the groove. Such a design affords the advantage that the first fluid pressure can be used to move the seal ring in the axial direction toward the second part, in order to press the sealing projection into a position reliably bearing against the sealing face of the second part.

In particular, the first part can be a valve and the second part can be a solenoid. The valve can be a check valve, especially a double check valve. The solenoid can be designed as a magnetic core, a magnetic core tube, or the like. For example, the valve and the solenoid can be suitable for, or used for, a fluid level control of a vehicle trailer. Such a design affords the advantage, in particular, that no design changes are needed for the solenoid or existing magnetic core arrangements can be used without change and thus costs can be saved when using the seal ring according to embodiments of the invention.

A method for making a seal ring for axially sealing two parts arranged so as to be able to move axially with respect to one another, has the following steps:

(a) forming the seal ring from an elastic material with two sealing lips, arranged circumferentially on a first axial end side of the seal ring, wherein (b) the sealing lips are designed such that they can be spread apart from one another by a first fluid pressure of a first fluid volume to bear in a sealing manner against mutually opposing sealing faces of a first of the parts, and with a sealing projection, which is arranged circumferentially on a second end side of the seal ring, oriented axially away from the first end side, wherein (c) the sealing projection is designed in order, when in a state bearing against a sealing surface of a second of the parts, to seal the first fluid volume in a region arranged radially inward with respect to the sealing projection against a second fluid volume at a second fluid pressure in a region arranged radially outward with respect to the sealing projection.

By carrying out the method, an embodiment of the aforementioned seal ring can be advantageously produced. The forming step in this case can involve a forming process.

In the step of forming, the seal ring can be formed with a first surface roughness in a first surface portion comprising end portions of the sealing lips having the sealing projection and sealing edges, and a second surface roughness in a second surface portion outside of the first surface portion, the first surface roughness being less than the second surface roughness. In this case, the first surface portion and optionally also the second surface portion can be left in particular in a state as delivered or in a rough state and be machined in addition or alternatively without a material removal method. Such an embodiment affords the advantage that suitable surface roughness values can already be established during a forming or reforming of the seal ring, so that further machining steps can be omitted, especially material separation steps.

A method for operating a seal system with two parts arranged so as to be able to move axially with respect to one another and axial sealing has the following steps:

a) providing an embodiment of the aforementioned seal system; and b) applying the first fluid pressure in the region of the first part, in order to spread the sealing lips of the seal ring into the sealing position bearing against the mutually opposing sealing faces of the groove of the first part and to move the seal ring axially in the direction from the first end side toward the second end side with the sealing projection into a sealing position bearing against the sealing face of the second part in order to seal off the first fluid volume and the second fluid volume from each other.

The operating method can be advantageously implemented making use of an embodiment of the aforementioned seal system in order to seal off the first part and the second part or the fluid volumes from each other.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the preferred exemplary embodiments of the present invention, the same or similar reference symbols shall be used for the elements represented in the different drawings and having similar action, omitting a second description of these elements.

Figure 1:
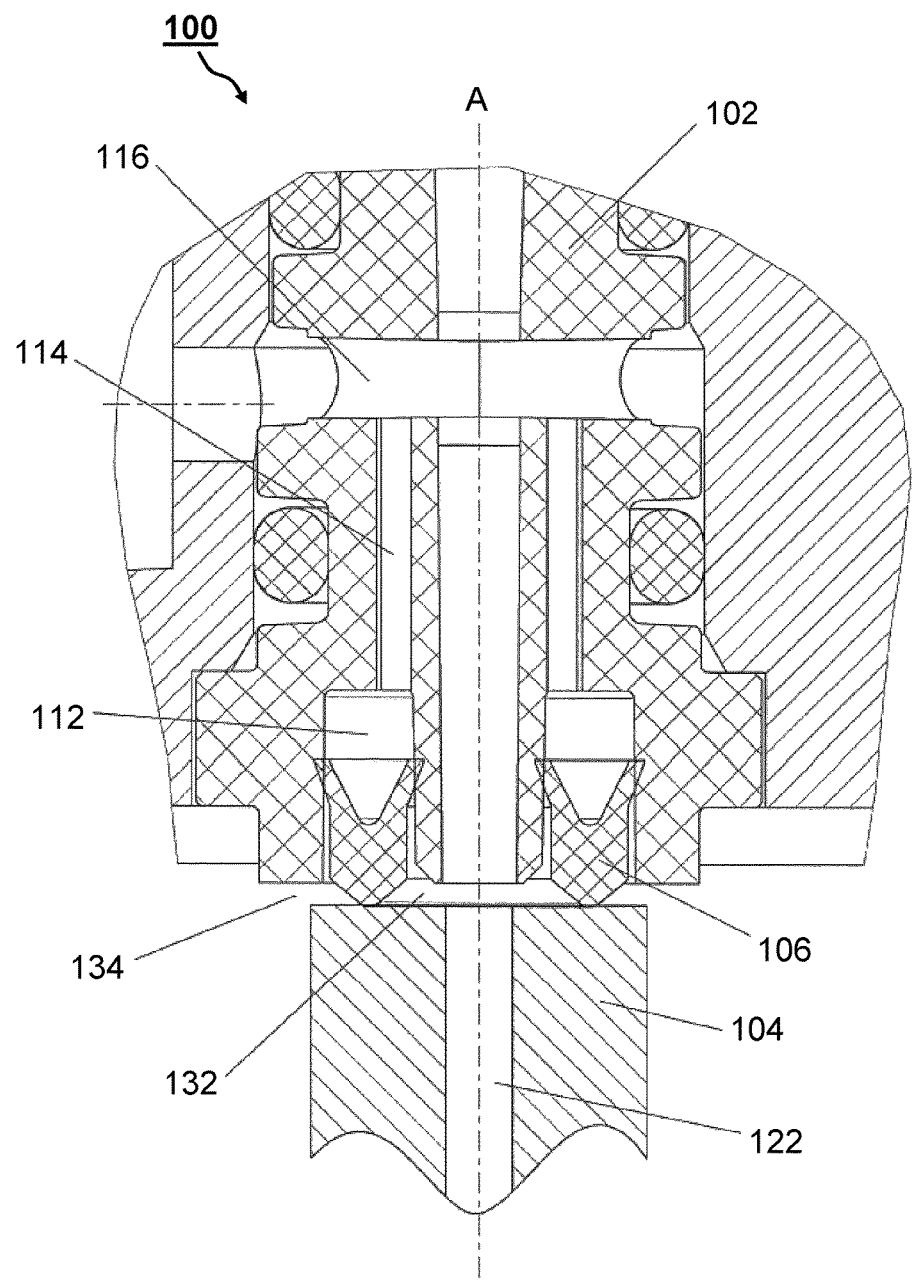
FIG. 1 is a sectional representation of a seal system according to one exemplary embodiment of the present invention.

FIG. 1 shows a sectional representation of a seal system 100 according to one embodiment of the present invention. The seal system 100 represented in FIG. 1 is intended for an application in connection with an electronic level control (ELC) for a trailer of a vehicle, such as a truck or other commercial vehicle. The seal system 100 has a principal axis of extension A.

The seal system 100 includes a first part 102 and a second part 104. The parts 102, 104 are arranged so as to be able to move axially with respect to one another. According to the embodiment of the present invention represented in FIG. 1, the first part 102 is a valve, more precisely, a double check valve, and the second part 104 is a solenoid, more precisely, a magnetic core tube. The double check valve and the magnetic core tube, i.e., the first part 102 and the second part 104, have an axial tolerance with respect to each other along the principal axis of extension A. For the axial sealing between the first part 102 and the second part 104, the seal system 100 moreover has a seal ring 106. The seal ring 106 is arranged between the first part 102 and the second part 104. The seal ring 106 is designed to provide an axial sealing for the first part 102 and the second part 104, which are arranged able to move axially with respect to one another. The seal ring 106 shall be discussed further below and with reference to FIG. 2.

The first part 102 or the double check valve has an annular groove 112 or depression. The groove 112 here is formed in a side of the first part 102 facing the second part 104. The groove 112 has mutually opposing sealing faces. The seal ring 106 is at least partly held in the groove 112. Two sealing lips of the seal ring 106 are arranged here bearing against the sealing faces of the groove 112. A sealing projection of the seal ring 106 extends out from the groove 112 in the direction of the second part 104.

According to the embodiment of the present invention represented in FIG. 1, at least one through opening 114 or fluidic connection and one chamber 116 are formed in the first part 102. The at least one through opening 114 extends in the first part 102 between the groove 112 and the chamber 116. More precisely, the at least one through opening 114 is formed between an end surface at a bottom of the groove 112 and the chamber 116. The at least one through opening 114 is arranged between the groove 112 and the chamber 116. In particular, the at least one through opening 114 has a longitudinal axis of extension which is parallel to the principal axis of extension A within manufacturing tolerances.

The second part 104 or the magnetic core tube has a sealing face oriented toward the first part 102. The sealing projection of the seal ring 106 is arranged to bear against the sealing face of the second part 104. According to the embodiment of the present invention represented in FIG. 1, the second part 104 has a borehole 122 along the principal axis of extension A. Even though not explicitly indicated in FIG. 1, the first part 102 has an axial borehole along the principal axis of extension A. In the first part 102, the axial borehole is arranged radially inward with respect to the groove 112. By means of the axial borehole a fluidic connection is established in the first part 102 between the chamber 116 and a surface on the side facing the second part 104.

The chamber 116 of the first part 102 can be subjected to a first fluid pressure of a first fluid volume. Thus, thanks to the through opening 114, the first fluid pressure also exists in a partial portion of the groove 112 arranged between the through opening 114 and the seal ring 106. The sealing lips of the seal ring 106 are designed to be spread apart from one another by the first fluid pressure of the first fluid volume to bear in a sealing manner against the mutually opposing sealing faces of the groove 112. The seal ring 106 is designed to be moved on account of the first fluid pressure in the groove 112 in the direction of the second part 104. More precisely, the seal ring 106 is designed to be moved by the first fluid pressure with the sealing projection in a sealing manner bearing against the sealing face of the second part 104.

Due to the axial borehole in the first part 102, the first fluid pressure is present in an internal region 132 between the first part 102 and the second part 104 arranged radially inward with respect to the sealing projection of the seal ring 106. Thus, the first fluid volume includes at least the chamber 116, the at least one through opening 114, the partial portion of the groove 112, the axial borehole in the first part 102 and the internal region 132. If the sealing projection of the seal ring 106 is arranged to bear against the sealing face of the second part 104, the sealing projection is designed to seal off the first fluid volume in the internal region 132 from a second fluid volume with a second fluid pressure in an external region 134 arranged radially outward from the sealing projection. The second fluid pressure here is less than the first fluid pressure.

In other words, the seal system 100 includes in particular the seal ring 106 or an elastic ring in the annular groove 112. The seal ring 106 has a sealing projection on one side and two narrow flexible sealing lips on the other side. The sealing lips terminate in sealing edges. The partial portion of the groove 112 between the flexible lips and the at least one through opening 114 has a fluidic connection with a side of the seal system 100 which is exposed to pressure. In a state exposed to pressure, i.e., the first fluid pressure, the sealing lips seal off the partial portion of 112 and the sealing projection is pressed against the sealing face of the second part 104, the side exposed to pressure being sealed off from a side of the seal system 100 not exposed to pressure.

If a pressure of the first fluid volume, i.e., the first fluid pressure, is released from the chamber 116, a venting occurs in the direction of the chamber 116, but this can also bypass the sealing projection of the seal ring 106 and reach in the direction of the external region 134 or the side of the seal ring 106 not subjected to pressure. In a state not subjected to pressure, no seal exists between the two components or parts 102 and 104, in particular no sealing force and no contact exists between the sealing projection of the seal ring 106 and the sealing face of the second part 104.

Figure 2:
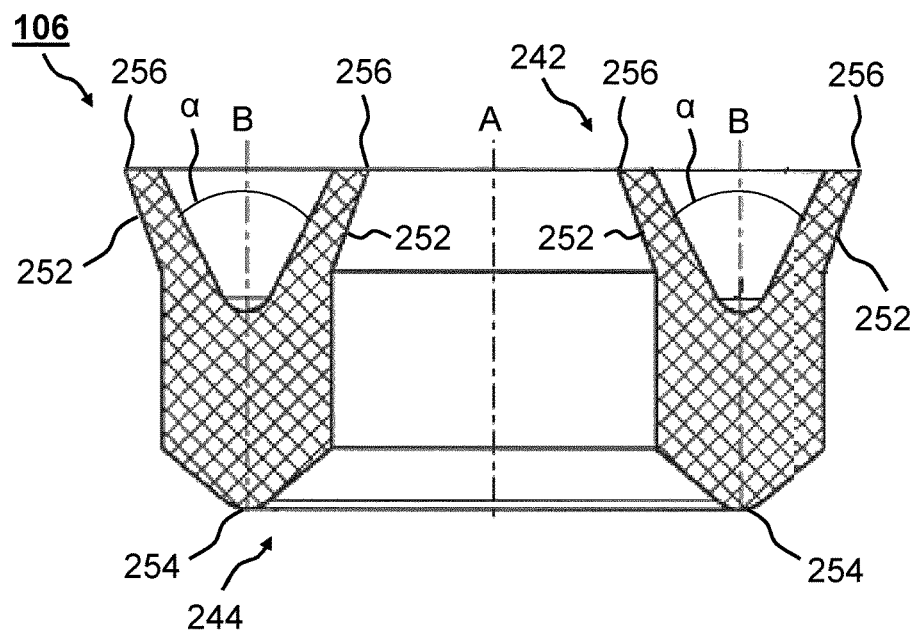
FIG. 2 is a partial sectional representation of a seal ring according to one exemplary embodiment of the present invention.

FIG. 2 shows a partial sectional representation of a seal ring 106 according to one embodiment of the present invention. The seal ring 106 is designed for the axial sealing of two parts arranged so as to be able to move axially with respect to one another. The seal ring 106 is the seal ring from FIG. 1. The seal ring 106 is made from an elastic material, such as a plastic material. The seal ring 106 here is shown in the non-installed state.

The seal ring 106 in the representation of FIG. 2 is shown sectioned, such that the principal axis of extension A, corresponding to the principal axis of extension of FIG. 1, represents a principal axis of symmetry of the seal ring 106. Two sectioned profiles of a body of the seal ring 106 are shown, being symmetrical relative to each other with respect to the principal axis of extension A. The two sectioned profiles here are identical to each other, since the body of the seal ring 106 is shaped uniformly. Each of the two sectioned profiles has an axis of symmetry B, which runs parallel to the principal axis of extension A. In the following, the form and structure of the seal ring 106 shall be explained for the most part making reference to one of the identical sectioned profiles.

The seal ring 106 has, in relation to the principal axis of extension A, a first end side 242 and, facing away from the first end side 242, a second end side 244. In terms of the representation of the seal ring 106 in FIG. 1, the first end side 242 faces the at least one through opening and the second end side 244 faces toward the sealing face of the second part.

On the first end side 242 there are formed or arranged two sealing lips 252 of the seal ring 106. The sealing lips 252 are arranged circumferentially about the seal ring 106 on the first end side 242. According to the embodiment of the present invention represented in FIG. 1, a partial portion of the seal ring 106 having the sealing lips 252 has a V-shaped cross sectional profile. The sealing lips 252 are designed such that they can be spread apart from one another by a fluid pressure which can be applied to the first end side 242 to bear in a sealing manner against (purely as an example) the mutually opposing sealing faces of the first part in FIG. 1. Each of the sealing lips 252 has a sealing edge 256 at a free end portion on an outer side in relation to the axis of symmetry B. In particular, the sealing lips 252 are designed to be spread apart at least with the sealing edges 256 in a sealing manner against the sealing lips.

On the second end side 244 there is formed or arranged a sealing projection 254 of the seal ring 106. The sealing projection 254 is arranged circumferentially around the seal ring 106 on the second end side 244. The sealing projection 254 is arranged between two flanks or partial portions of the second end side 244 which are inclined toward it. The sealing projection 254 is designed to be moved in a sealing manner against (purely as an example) the sealing face of the second part in FIG. 1 when the seal ring is moved by virtue of a fluid pressure applied to the first end side 242 axially or along the principal axis of extension A in the direction from the first end side 242 to the second end side 244.

Between the sealing lips 252 and a starting point of the flanks of the second end side 244 inclined toward the sealing projection 254 the seal ring 106 in FIG. 2 has a middle body with side surfaces oriented along the axis of symmetry B.

In the representation of FIG. 2, it will be noticed that the sealing lips 252 according to the embodiment of the present invention represented in FIG. 2 subtend an acute resting opening angle α between them. In this case, an inner resting opening angle α is subtended between flanks of the two sealing lips 252 facing each other and an outer resting opening angle is subtended between flanks of the two sealing lips 252 facing away from each other, which is not explicitly indicated in FIG. 2. The inner resting opening angle α here is larger than the outer resting opening angle. Thus, the sealing lips 252 are formed tapering toward their free end portions. In particular, the inner resting opening angle α and the outer resting opening angle can each have a value of, for example, more than 30 degrees, and for example less than 70 degrees. Merely as an example, the inner resting opening angle α according to the sample embodiment of the present invention represented in FIG. 2 amounts to 54 degrees and the outer resting opening angle amounts to 40 degrees.

According to an exemplary embodiment of the present invention, the seal ring 106 is made from an elastic material. The elastic material in this case has a first surface roughness in a first surface portion, which includes at least the sealing projection 254 and the sealing edges 256 of the sealing lips 252. The elastic material has a second surface roughness in a second surface portion outside of the first surface portion or in a remaining surface portion. The first surface roughness is less than the second surface roughness. In particular, the first surface roughness can be characterized by an average roughness value of 4 and the second surface roughness by an average roughness value of 10, for example. The entire surface or at least the first surface portion of the seal ring 106 can be left in the state as delivered or the rough state, and additionally or alternatively can be machined without material removing methods.

According to one embodiment, the sealing projection 254 can be or can become displaced away from the axis of symmetry B in the direction of the principal axis of extension A. In this case, a sealing force can be or can become heightened. If the sealing projection 254 is or becomes displaced from the principal axis of extension A to the axis of symmetry B, the sealing force can then be or become decreased.

Figure 3:
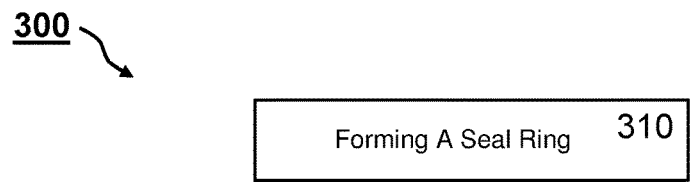
FIG. 3 is a flow chart of a method for making a seal ring according to one exemplary embodiment of the present invention.

FIG. 3 shows a flow chart of a method 300 according to one embodiment of the present invention. The method 300 serves to make a seal ring for the axial sealing of two parts arranged so as to be able to move axially with respect to one another. By carrying out the method 300, it is possible to make a seal ring such as the seal ring in FIG. 1 or FIG. 2. Thus, the method 300 is suited for making a seal ring such as the seal ring in FIG. 1 or FIG. 2.

The method 300 involves a step of forming the seal ring from an elastic material with two sealing lips and with a sealing projection. The forming step 310 is carried out such that the sealing lips are arranged and formed circumferentially on a first axial end side of the seal ring and are designed such that they can be spread apart from one another by a first fluid pressure of a first fluid volume to bear in a sealing manner against mutually opposing sealing faces of a first of the parts. Moreover, the forming step 310 is carried out such that the sealing projection is arranged and formed circumferentially on a second end side of the seal ring, oriented axially away from the first end side, in order, when in a state bearing against a sealing face of a second of the parts, to seal the first fluid volume in a region arranged radially inward with respect to the sealing projection against a second fluid volume in a region arranged radially outward with respect to the sealing projection.

According to an embodiment, in the forming step 310 the seal ring is formed with a first surface roughness in a first surface portion comprising end portions of the sealing lips having the sealing projection and sealing edges, and a second surface roughness in a second surface portion outside of the first surface portion, the first surface roughness being less than the second surface roughness.

Figure 4:
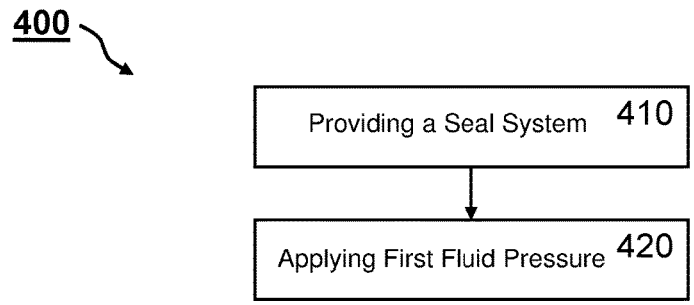
FIG. 4 is a flow chart of a method for operating a seal system according to one exemplary embodiment of the present invention.

FIG. 4 is a flow chart of a method 400 according to one embodiment of the present invention. The method 400 serves for operating a seal system with two parts arranged so as to be able to move axially with respect to one another and axial sealing. By carrying out the method 400, a seal system can be operated such as the seal system in FIG. 1. Thus, the method 400 is suited to operating a seal system such as the seal system in FIG. 1.

The method 400 has a step 410 of providing a seal system. The seal system is the seal system in FIG. 1. The method 400 also has a step 420 of applying the first fluid pressure in the region of the first part. The applying of the first fluid pressure in the region of the first part in step 420 has the effect of spreading the sealing lips of the seal ring into the sealing position bearing against the mutually opposing sealing faces of the groove of the first part. Moreover, it has the effect of moving the seal ring axially in the direction from the first end side toward the second end side with the sealing projection into a sealing position bearing against the sealing face of the second part. In this way, the first fluid volume and the second fluid volume can be sealed off from each other.

The described embodiments are chosen merely as examples and can be combined with each other.

LIST OF REFERENCE SYMBOLS 100 seal system
102 first part or double check valve
104 second part or magnetic core tube
106 seal ring
112 annular groove
114 through opening or fluidic connection
116 chamber
122 borehole
132 internal region or region subjected to pressure
134 external region or region not subjected to pressure
A principal axis of extension
242 first end side
244 second end side
252 sealing lip
254 sealing projection
256 sealing edge
B axis of symmetry
α resting opening angle
300 method for fabrication
310 forming step
400 method for operation
410 step of providing
420 step of applying The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seal ring for axial sealing of two parts arranged axially moveably with respect to one another, the seal ring comprising:
   two sealing lips, which are arranged circumferentially on an axial first end side of the seal ring, wherein
   the sealing lips are configured to be spreadable apart from one another by a first fluid pressure of a first fluid volume so as to bear in a sealing manner against mutually opposing sealing faces of a first of the two parts;
   a middle body with side surfaces; and
   a sealing projection, which is located between two flanks inclined relative to the side surfaces of the middle body toward one another and arranged circumferentially on an axial second end side of the seal ring opposite the axial first end side of the seal ring with respect to the middle body, oriented axially away from the first end side, wherein
   the sealing projection is configured in order, when in a state bearing against a sealing face of a second of the two parts, to seal the first fluid volume in a region arranged radially inward with respect to the sealing projection against a second fluid volume at a second fluid pressure in a region arranged radially outward with respect to the sealing projection.

2. The seal ring according to claim 1, wherein
   the seal ring is further configured such that, when a fluid pressure gradient is present between the first fluid pressure of the first fluid volume and the second fluid pressure of the second fluid volume, the sealing is moveable axially in a direction from the first end side toward the second end side with the sealing projection into a sealing position bearing against the sealing face of the second part, and the first fluid pressure is greater than the second fluid pressure.

3. The seal ring according to claim 2, wherein
   the sealing lips are configured to subtend between them an acute resting opening angle in a non-installed state of the seal ring.

4. The seal ring according to claim 1, wherein
   the sealing lips are configured to subtend between them an acute resting opening angle in a non-installed state of the seal ring.

5. The seal ring according to claim 1, wherein
   the seal ring is formed from an elastic material with a first surface roughness in a first surface portion, which comprises the sealing projection and the sealing edges of the sealing lips, and a second surface roughness in a second surface portion outside of the first surface portion, the first surface roughness being less than the second surface roughness.

6. A seal system, comprising:
   a first part, in which an annular groove is formed with mutually opposing sealing faces;
   a second part with a sealing face, wherein the first part and the second part are arranged moveably with respect to one another along a mutual axial axis; and a seal ring for axial sealing of the first and second parts arranged moveably with respect to one another along the mutual axis, the seal ring comprising:

two sealing lips, which are arranged circumferentially on an axial first end side of the seal ring, wherein the sealing lips are configured to be spreadable apart from one another by a first fluid pressure of a first fluid volume so as to bear in a sealing manner against mutually opposing sealing faces of a first of the two parts;

a middle body with side surfaces; and a sealing projection, which is located between two flanks inclined relative to the side surfaces of the middle body toward one another and arranged circumferentially on an axial second end side of the seal ring opposite the axial first end side of the seal ring with respect to the middle body, oriented axially away from the first end side, wherein the sealing projection is configured in order, when in a state bearing against a sealing face of a second of the two parts, to seal the first fluid volume in a region arranged radially inward with respect to the sealing projection against a second fluid volume at a second fluid pressure in a region arranged radially outward with respect to the sealing projection, and wherein at least the sealing lips of the seal ring are arranged in the groove of the first part, and the sealing projection of the seal ring is arrangeable bordering on the sealing face of the second part.

7. The seal system according to claim 6, wherein
at least one through opening is formed in the first part between the groove and a chamber subjected to the first fluid pressure of the first fluid volume.

8. The seal system according to claim 6, wherein the first part is a valve and the second part is a solenoid.

9. A method for making a seal ring for axially sealing two parts arranged so as to be able to move axially with respect to one another, the method comprising the acts of:

forming the seal ring from an elastic material:

(a) with two sealing lips, arranged circumferentially on a first axial end side of the seal ring, wherein (b) the sealing lips are configured to be spreadable apart from one another by a first fluid pressure of a first fluid volume so as to bear in a sealing manner against mutually opposing sealing faces of a first of the two parts, (c) with a middle body with side surfaces, and (d) with a sealing projection, which is located between two flanks inclined relative to the side surfaces of the middle body toward one another and arranged circumferentially on a second end side of the seal ring opposite the axial first end side of the seal ring with respect to the middle body, oriented axially away from the first end side, wherein the sealing projection is configured in order, when in a state bearing against a sealing surface of a second of the two parts, to seal the first fluid volume in a region arranged radially inward with respect to the sealing projection against a second fluid volume at a second fluid pressure in a region arranged radially outward with respect to the sealing projection.

10. The method according to claim 9, wherein
in the forming act, the seal ring is formed with (a) a first surface roughness in a first surface portion comprising end portions of the sealing lips having the sealing edges, and the sealing projection, and (b) a second surface roughness in a second surface portion outside of the first surface portion, the first surface roughness being less than the second surface roughness.

11. A method of operating an axial sealing seal system with two parts arranged so as to be able to move axially with respect to one another, wherein the method comprises the acts of:

providing a seal system comprising a first part, in which an annular groove is formed with mutually opposing sealing faces, a second part with a sealing face, wherein the first part and the second part are arranged moveably with respect to one another along a mutual axial axis, and a seal ring for axial sealing of the first and second parts arranged moveably with respect to one another along the mutual axis, the seal ring comprising two sealing lips, which are arranged circumferentially on an axial first end side of the seal ring, wherein the sealing lips are configured to be spreadable apart from one another by a first fluid pressure of a first fluid volume so as to bear in a sealing manner against mutually opposing sealing faces of a first of the two parts, a middle body with side surfaces, and a sealing projection, which is located between two flanks inclined relative to the side surfaces of the middle body toward one another and arranged circumferentially on an axial second end side of the seal ring opposite the axial first end side of the seal ring with respect to the middle body, oriented axially away from the first end side, wherein the sealing projection is configured in order, when in a state bearing against a sealing face of a second of the two parts, to seal the first fluid volume in a region arranged radially inward with respect to the sealing projection against a second fluid volume at a second fluid pressure in a region arranged radially outward with respect to the sealing projection, and wherein at least the sealing lips of the seal ring are arranged in the groove of the first part, and the sealing projection of the seal ring is arrangeable bordering on the sealing face of the second part; and applying the first fluid pressure in the region of the first part, in order to spread the sealing lips of the seal ring into the sealing position bearing against the mutually opposing sealing faces of the groove of the first part and to move the seal ring axially in the direction from the first end side toward the second end side with the sealing projection into a sealing position bearing against the sealing face of the second part in order to seal off the first fluid volume and the second fluid volume from each other.

* * * * *